Patented Feb. 26, 1935

REISSUED 1,992,601

UNITED STATES PATENT OFFICE 1,992,601

METHOD OF MAKING FRICTION ELEMENTS

William A. Blume, Detroit, Mich., assignor to American Brakeblok Corporation, New York, N. Y., a corporation of New York No Drawing. Original application January 5, 1931, Serial No. 506,752. Divided and this application April 16, 1932, Serial No. 605,782

3 Claims. (Cl. 18—47.5)

This application is a division of my application Serial No. 506,752, filed January 5, 1931.

This invention relates to the method of making composition friction elements and its object is to provide a novel friction element which is flexible and tough, which is wear and heat resistant and which can be readily and easily prepared and formed to shapes for brakes, clutches and other mechanical devices wherein a braking or retarding effect is required.

It is a specific object of the invention to make a friction element in strip form which has sufficient flexibility and transverse strength to enable it to be readily conformed and applied to arcuate or other supports therefor in brakes, clutches and the like and which is dense and hard and possesses desired friction qualities.

In the practice of my invention I provide a base mixture of short fiber asbestos, finely divided natural pyrobituminous material, to which sulfur and slaked lime may be added, and mix the same thoroughly in a dough mixer or other suitable apparatus. I also provide a bond mixture of vegetable drying oil, such as linseed oil, purely polymerized, that is, containing substantially no oxidized oil, and a solvent or thinner and add this bond mixture to the base mixture in the mixer and agitate the mass until the bond mixture is thoroughly incorporated in the base mixture. The resulting composition is then molded in a continuous strip of desired dimensions and the strip is formed in a coil or cut into lengths and the coil or lengths are placed in a suitable oven and cured. A mixture which I have used comprises short fiber asbestos 65 pounds; finely divided bituminous coal 25 pounds; sulfur 3 pounds; slaked lime 2 pounds; purely polymerized linseed oil 15 pounds; and oleum spirits 7½ pounds. I use a purely polymerized linseed oil which has an acid No. 2.5. Whereas, ordinarily, linseed oil raw or double boiled becomes hard, dry and brittle in curing, purely polymerized linseed oil becomes tough, elastic and flexible in curing, and for these reasons it is highly desirable in the manufacture of composition friction elements because it imparts these qualities to the elements and provides a strong, tough element having desired tensile and cross-sectional strength and sufficient flexibility to enable it to be readily adapted for different installations. The purely polymerized linseed oil is sticky, gummy and of the consistency of heavy molasses and I find it desirable to cut the oil with a suitable solvent or thinner to a consistency which will permit it to be readily mixed with the base mixture.

The coils or cut lengths of strip material are placed in an oven and are subjected to a curing temperature of from 125° F. to 200° F. for a sufficient length of time, depending upon the thickness of the material, to drive off the volatile matter, and then the temperature is stepped up to from 250° F. to 350° F. and maintained until the curing is completed. This curing operation is conducted without pressure and may continue from 8 to 15 hours.

The low acid value of the purely polymerized oil insures a low free fatty acid content. The slaked lime under heat supplied in the curing operation saponifies more or less of the free fatty acid content and produces a form of soap which remains in the product as a latent lubricant. Under the heat of braking friction this soap produces a slight lubricant effect which helps to prevent scoring or other destructive action of the brake element upon the brake drum or other part to be braked. The slaked lime has the further quality of preventing shrinkage and warpage in curing, to a large extent. The sulfur assists in maintaining the desired flexible quality of the element by causing the purely polymerized oil to dry to a tough elastic film in a shorter time and at a lower temperature.

My invention provides a friction element which is particularly useful in brakes and clutches and which may be used for many other purposes. It is solid and hard, but not rigid, and it has sufficient flexibility to enable it to be easily fitted to arcuate or other supports for which it is adapted without liability of fracturing the composition body, which would tend to promote disintegration and lessen the efficiency and life of the element. While I believe the invention will be used principally in the manufacture of friction elements in the form of strips, it can also be used in the manufacture of friction elements in the form of blocks in a mold press and it will be desirable in blocks because of the strength and flexibility which it imparts to the blocks.

I do not restrict the invention to the specific materials and formula herein specified but reserve the right to use any equivalents for the materials and to vary the proportions and the temperatures in the curing operation as may be found desirable to satisfy different conditions or for other purposes, within the scope of the following claims.

I claim:

1. The herein described method of making friction elements which consists in mixing with a friction material a bond of vegetable drying oil purely polymerized, that is, containing substantially no oxidized oil and not otherwise chemically changed, forming the resulting composition into shapes, and then curing the shapes by subjecting them to heat in the presence of air and without pressure at a temperature below the point of destruction of the molecular constitution of the oil and for a period of time sufficient to set the bond and without inducing side reactions such as oxidation.

2. The herein described method of making friction elements which consists in preparing a base mixture including a fibrous material and finely divided natural pyrobituminous material, mixing the base mixture with a bond of vegetable drying oil purely polymerized, that is, containing substantially no oxidized oil and not otherwise chemically changed, forming the resulting composition into shapes, and then curing the shapes by subjecting them to heat in the presence of air and without pressure at a temperature below the point of destruction of the molecular constitution of the oil and for a period of time sufficient to set the bond and without inducing side reactions such as oxidation.

3. The herein described method of making friction elements which consists in preparing a base mixture including 65 pounds of asbestos and 25 pounds of finely divided pyrobituminous material, mixing with the base mixture a bond of 15 pounds of vegetable drying oil purely polymerized, that is, containing substantially no oxidized oil and not otherwise chemically changed, forming the resulting composition into shapes, and then curing the shapes by subjecting them to heat in the presence of air and without pressure at a temperature below the point of destruction of the molecular constitution of the oil and for a period of time sufficient to set the bond and without inducing side reactions such as oxidation.

WILLIAM A. BLUME.